US009401126B2

(12) United States Patent
Jeong et al.

(10) Patent No.: US 9,401,126 B2
(45) Date of Patent: Jul. 26, 2016

(54) DISPLAY DRIVER FOR PENTILE-TYPE PIXELS AND DISPLAY DEVICE INCLUDING THE SAME

(71) Applicant: SAMSUNG DISPLAY CO., LTD., Yongin, Gyeonggi-Do (KR)

(72) Inventors: Geun Young Jeong, Busan (KR); Ji Yeon Yang, Hwaseong-si (KR); Byung Hyun Kim, Chungcheongnam-do (KR); Takeshi Kato, Gyeonggi-do (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 0 days.

(21) Appl. No.: 14/339,792

(22) Filed: Jul. 24, 2014

(65) Prior Publication Data

US 2015/0138218 A1    May 21, 2015

(30) Foreign Application Priority Data

Nov. 19, 2013    (KR) .......................... 10-2013-0140754

(51) Int. Cl.
*G09G 5/02*    (2006.01)
*G06T 9/00*    (2006.01)

(52) U.S. Cl.
CPC .. *G09G 5/02* (2013.01); *G06T 9/00* (2013.01); *G09G 2320/0276* (2013.01); *G09G 2320/0673* (2013.01); *G09G 2340/02* (2013.01); *G09G 2340/0457* (2013.01); *G09G 2340/06* (2013.01)

(58) Field of Classification Search
None
See application file for complete search history.

(56) References Cited

U.S. PATENT DOCUMENTS

| 5,668,596 | A  | * | 9/1997 | Vogel ......................... 348/222.1 |
| 2002/0176104 | A1 | * | 11/2002 | Noguchi et al. ............... 358/1.9 |
| 2009/0052772 | A1 | * | 2/2009 | Speirs et al. .................. 382/166 |
| 2009/0092325 | A1 | * | 4/2009 | Brown Elliott et al. ...... 382/232 |
| 2010/0027067 | A1 | * | 2/2010 | Tsunekawa ................... 358/1.15 |
| 2011/0025591 | A1 | * | 2/2011 | Han et al. ...................... 345/102 |
| 2012/0120043 | A1 |   | 5/2012 | Cho et al. |
| 2012/0287141 | A1 | * | 11/2012 | Higgins et al. ................ 345/581 |
| 2012/0287148 | A1 | * | 11/2012 | Brown Elliott ............... 345/593 |
| 2013/0127923 | A1 | * | 5/2013 | An et al. ....................... 345/690 |

FOREIGN PATENT DOCUMENTS

| KR | 10-2011-0063023 A | 6/2011 |
| KR | 10-2011-0123531 A | 11/2011 |
| KR | 10-2013-0033096 A | 4/2013 |

* cited by examiner

*Primary Examiner* — Joni Richer
(74) *Attorney, Agent, or Firm* — Lee & Morse, P.C.

(57) ABSTRACT

A display driver includes a video data conversion unit, a data compression unit, a memory unit, and a data restoration unit. The video data conversion unit converts first video data that includes RGB data to second video data that includes pentile data. The data compression unit compresses at least a portion of the second video data. The memory unit stores at least the compressed second video data. The data restoration unit restores the compressed second video data.

20 Claims, 6 Drawing Sheets

DISPLAY DRIVER FOR PENTILE-TYPE PIXELS AND DISPLAY DEVICE INCLUDING THE SAME

CROSS-REFERENCE TO RELATED APPLICATION

Korean Patent Application No. 10-2013-0140754, filed on Nov. 19, 2013, and entitled, "Display Driver and Display Device Including the Same," is incorporated by reference herein in its entirety.

BACKGROUND

1. Field

One or more embodiments described herein relate a display driver and a display device including the same.

2. Description of the Prior Art

Display devices are used in televisions, monitors, notebook computers, mobile phones, personal digital assistants, smart phones, and other electronic devices and appliances. Examples of these display devices include liquid crystal displays, organic light emitting displays, and a plasma display panels.

SUMMARY

In accordance with one or more embodiment, a display driver includes a video data conversion unit to convert first video data that includes RGB data to second video data that includes pentile data; a data compression unit to compress at least a portion of the second video data; a memory unit to store at least the compressed second video data; and a data restoration unit to restore the compressed second video data.

The video data conversion unit may include a sub-pixel rendering unit to change the first video data to the second video data. The video data conversion unit may include a dithering unit to dither the second video data output from the sub-pixel rendering unit. The video data conversion unit may include an input gamma unit and an output gamma unit, the input gamma unit may receive the first video data and output an input gamma value to the sub-pixel rendering unit, and the output gamma unit may receive the second video data from the sub-pixel rendering unit and to output an output gamma value to the dithering unit.

The video data conversion unit may include a limited gradation data processing unit, and the first video data may be input to the sub-pixel rendering unit in a first mode, the first video data may be input to the limited gradation data processing unit in a second mode, and the limited gradation data processing unit may perform simplified gradation adjustment of the input first video data and conversion of the gradation-adjusted first video data to the second video data.

The dithering unit may dither the second video data restored through the data restoration unit. The limited gradation data processing unit may include a dummy bit addition unit to adjust a number of bits of output data to be equal to a number of bits of output data of the sub-pixel rendering unit. The dithering unit may perform at least one of temporal dithering or spatial dithering.

The memory unit may include first memory unit and a second memory unit, the first memory unit may store the second video data compressed through the data compression unit, and the second memory unit may store the second video data converted through the limited gradation data processing unit.

The display driver may include a video graphics processing unit to receive the first video data from a host, to convert video graphics, and to provide the converted video graphics to the video data conversion unit. The display driver may include a post data processing unit to process the second video data restored through the data restoration unit.

In accordance with another embodiment, a display device includes a display panel including a plurality of pixels in a pentile-type arrangement; and a display driver to drive the display panel, wherein the display driver includes: a video data conversion unit to convert first video data that includes RGB to second video data that includes pentile data; a data compression unit to compress at least a portion of the second video data; a memory unit to store at least the compressed second video data; and a data restoration unit to restore the compressed second video data.

The video data conversion unit may include a sub-pixel rendering unit to change the first video data to second video data. The video data conversion unit may include a dithering unit to dither the second video data from the sub-pixel rendering unit.

The video data conversion unit may include input gamma unit and an output gamma unit, the input gamma unit may receive the first video data and outputs an input gamma value to the sub-pixel rendering unit, and the output gamma unit may receive the second video data output from the sub-pixel rendering unit and outputs an output gamma value to the dithering unit.

The video data conversion unit may include a limited gradation data processing unit, the first video data may input to the sub-pixel rendering unit in a first mode, the first video data may input to the limited gradation data processing unit in a second mode, and the limited gradation data processing unit may perform simplified gradation adjustment of the input first video data and conversion of the gradation-adjusted first video data into the second video data.

The display device may include a dithering unit to dither the second video data restored through the data restoration unit. The limited gradation data processing unit may include dummy bit addition unit to adjust a number of bits of output data to be equal to a number of bits of output data of the sub-pixel rendering unit. The dithering unit may perform at least one of temporal dithering or spatial dithering.

The memory unit may include a first memory unit and a second memory unit, the first memory unit may store the second video data compressed through the data compression unit, and the second memory unit may store the second video data converted through the limited gradation data processing unit.

In accordance with another embodiment, a display driver includes a converter to convert first video data to second video data; a compressor to compress at least a portion of the second video data; a memory to store at least the compressed second video data; and a data restorer to restore the compressed second video data, wherein the first video data include RGB data and the second video data includes pentile data.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
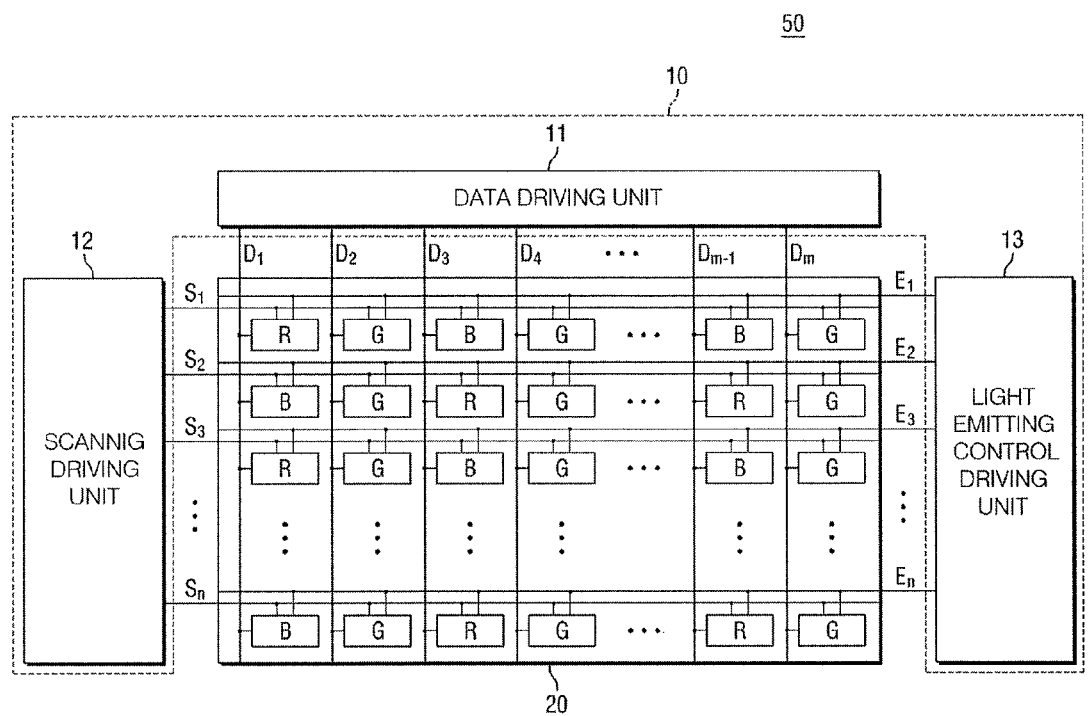
FIG. 1 illustrates an embodiment of a display device.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

FIG. 1 illustrates an embodiment of a display device 50 which includes a display panel 20 and a display driver 10. The display panel 20 includes a plurality of scanning lines S1 to Sn, a plurality of data lines D1 to Dm, and a plurality of light emitting control lines E1 to En. The scanning lines S1 to Sn and light emitting control lines E1 to En are arranged in parallel in a first direction. The data lines D1 to Dm are insulated from the scanning lines S1 to Sn and light emitting control lines E1 to En, and are arranged in parallel in a second direction that crosses (e.g., vertically) the first direction.

The display panel 20 includes a plurality of pixels R, G, and B arranged in a matrix. Each pixel is positioned between an adjacent pair of scanning lines S1 to Sn and an adjacent pair of data lines D1 to Dm.

The plurality of pixels may include a first pixel R to emit red light, a second pixel B to emit blue light and a third pixel to emit green light. The first pixel R, second pixel B, and third pixel G may be in a pentile arrangement. For example, the first pixel R and second pixel B may be alternately arranged on the (i+1)-th pixel line, and the third pixel G may be arranged on the (i+2)-th pixel line. Additionally, or alternatively, the second pixel B and first pixel R may be alternately arranged on the (i+3)-th pixel line opposite to the (i+1)-th pixel line, and the third pixel G may be arranged on the (i+4)-th pixel line in the same manner as the (i+2)-th pixel line. The pixel line arrangement as described above may be repeated in units of four pixel lines.

The display driver may include a data driving unit 11, scanning driving unit 12, and light emitting control driving unit 13. The scanning driving unit 12 generates scanning signals and selects corresponding pixels R, G, and B through scanning lines S1 to Sn. The data driving unit 11 generates data voltages to be supplied to respective pixels R, G, and B, selected by the scanning signals, through data lines D1 to Dm. The light emitting control driving unit 13 provides light emitting control signals to light emitting control lines E1 to En to allow the respective pixels R, G, and B to emit light.

The display driver 10 may be provided separately from display panel 20. In another embodiment, at least a part of the display driver may be formed in display panel 20. For example, scanning driving unit 12 of display driver 10 as described above may be formed on display panel 20.

Figure 2:
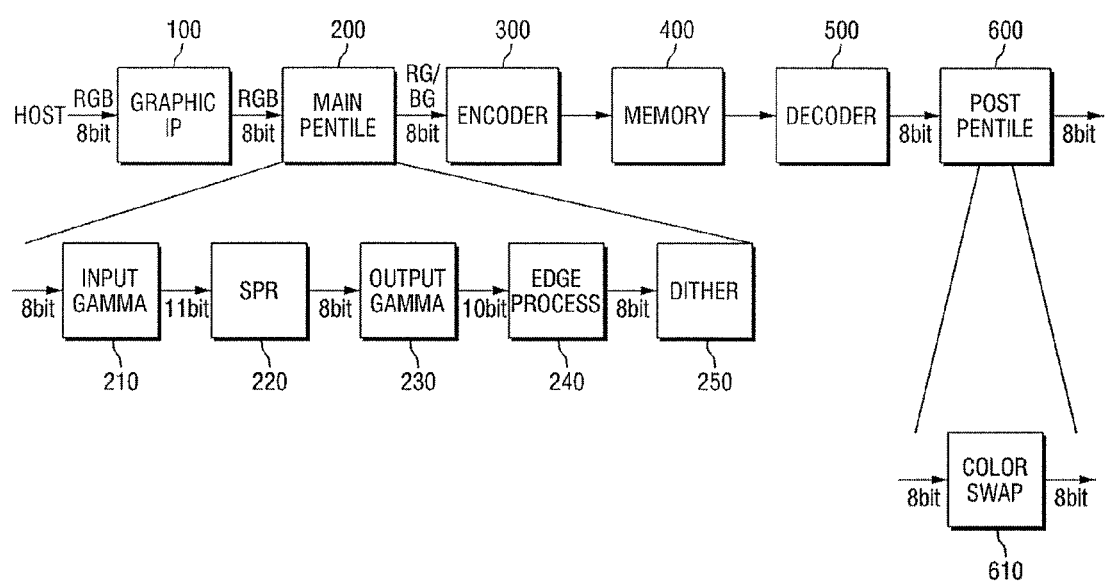
FIG. 2 illustrates an embodiment of a data driving unit.

FIG. 2 illustrates an embodiment of a data driving unit of a display driver, which, for example, may be data driving unit 11 in FIG. 1. The data driving unit includes a video data conversion unit 200, a data compression unit 300, a memory unit 400, and a data restoration unit 500. Further, the display driver may include a video graphics processing unit 100 and a post data processing unit 600.

The video graphics processing unit 100 may receive input of first video data from a host. The first video data may be RGB data, which includes R sub-pixel data, G sub-pixel data, and B sub-pixel data. The RGB data are mapped on different sub-pixels and may be sequentially input. In some embodiments, video graphics processing unit 100 may be omitted.

Video graphics processing unit 100 converts video graphics through processing of the input first video data. Video graphics conversion may include video conversion processes, such as sharpness, color reproduction, and/or white balance processes. The video graphics processing unit 100 may have first video data processing logic for video processing. The video processing and the degree thereof may be adjusted by a user selection.

The first video data that is processed through the video graphics processing unit 100 is input to video data conversion unit 200. The video data conversion unit 200 converts the first video data to second video data. The second video data may be pentile data which includes RG data and BG data. That is, video data conversion unit 200 may convert the RGB data to RG data and/or BG data.

The second video data is provided to data compression unit 300, which compresses the second video data. The second data compression may be performed by a binary encoding method and a DPCM (Differential Pulse Code Modulation) encoding method. The data compression unit 300 may include a single encoding module or a plurality of encoding modules. In one embodiment, the compression ratio of the data compression unit 300 may be 50%, but the ratio may be different in other embodiments.

The memory unit 400 stores the second video data compressed through data compression unit 300. The memory unit 400 may include a frame memory. The frame memory may integrate sequentially input RG/BG data for each frame and may store integrated data. The frame memory may store single frame video data or a plurality of frame data.

The data restoration unit 500 receives and restores the second video data stored in memory unit 400. Restoration of the second video data may be obtained by reverse compression of the second video data. The data restoration unit 500 may include a decoding module that corresponds to the encoding module of the data compression unit 300. For example, if data compression unit 300 includes a binary encoding module and DPCM encoding module, data restoration unit 500 may include a binary decoding module and a DPCM decoding module.

The restored second video data may be provided to post data processing unit 600. The post data processing unit 600 processes the restored second video data to basic data for generating a final data voltage. For example, post data processing unit 600 may include a color swap unit 610. The color swap unit 610 may rearrange the input order of the second video data according to the arrangement of pixels and data lines. The post data processing unit 600 may be omitted in alternative embodiments.

Data voltages are generated based on the second video data output from the post data processing unit 600, and the respective data voltages may be applied to the data lines of the display panel. The video data conversion unit 200 will now be described in detail.

The video data conversion unit 200 may include an input gamma unit 210, a sub-pixel rendering unit 220, an output gamma unit 230, a frame edge processing unit 240, and a dithering unit 250.

The input gamma unit 210 performs input gamma processing of the first video data. The first video data input to input gamma unit 210 may be video data displayed in a gradation domain. The input gamma unit 210 changes the first video data to video data in a luminance domain and displays the changed video data. At this time, because a low-gradation portion has a small luminance difference, it may be further sub-divided, and bits may be added to reflect the sub-divided contents in the data. For example, if the first video data input to input gamma unit 210 is composed of 8 bits, the input gamma value that is gamma-processed through input gamma unit 210 may be composed of 11 bits.

The sub-pixel rendering unit 220 receives the input gamma value, and converts the received gamma value to the second video data through combination of the input gamma value with neighboring pixels. For example, sub-pixel rendering unit 220 receives an RGB input gamma value and converts the received RGB input gamma value to RG data or BG data. At this time, the number of bits of the video data of each sub-pixel is kept the same, but the number of corresponding sub-pixels is reduced to ⅔ to cause the total amount of video data to be reduced to ⅔.

The output gamma unit 230 receives the rendered second video data and generates a corresponding output gamma value. The second video data input to output gamma unit 230 is data according to the luminance domain. The output gamma unit 230 may operate in a direction opposite to that of input gamma unit 210.

Accordingly, the number of bits of the output gamma value may be reduced compared with the number of bits of the input second video data. If sub-pixel rendering is not performed, the number of bits of the second video data would be reduced to the level of the first video data before it is processed through input gamma unit 210. However, because the second video data rendered through the sub-pixel rendering unit 220 is input to output gamma unit 230, data obtained in combination with the second video data and neighboring pixel data has already been reflected in the second video data of each pixel. Accordingly, data bits for expressing this may be added. In one embodiment, the number of bits of the second video data output from output gamma unit 230 may be 10 bits. Of course, the second video data may be output with a different number of bits in other embodiments.

The frame edge processing unit 240 corrects the video data at edge portions of the display panel. That is, the second video data is generated in combination with gradations of the neighboring pixels. At the edge portions of the display panel, the number of pixels to be compared with each other for combination becomes relatively small. Accordingly, frame edge processing unit 240 corrects the second video data in the neighborhood of the edge portions to minimize image distortion. The frame edge processing unit 240 may be omitted in an alternative embodiment The second video data processed through frame edge processing unit 240 is input to dithering unit 250, which performs dithering of the second video data. The dithering unit 250 may change the number of bits of the input second video data to the number of bits to be processed for output. For example, dithering unit 250 may change input second video data of 10 bits to data of 8 bits.

The dithering unit 250 may perform spatial dithering. That is, in an example of the number of bits changed as described above, dithering unit 250 may selectively add the next most significant bit value (third least significant bit based on the input data) of the neighboring pixel as deleting the least significant two bits in order to implement a video image similar to the original video image. The dithered second video data is provided to data compression unit 300.

In this embodiment, because video data conversion unit 200 is located at the front of memory unit 400, the capacity of the frame memory may be greatly reduced. That is, as described above, the amount of data provided from the host is reduced to a predetermined level (e.g., a level of ⅔) as the data passes through video data conversion unit 200. If it is assumed that the compression ratio of the data compression unit 300 is 50%, the total amount of the second video data input to memory unit 400 is reduced to ⅓ of the total amount of the first video data provided from the host. Accordingly, the capacity of the frame memory of the memory unit 400 may be reduced to the level of ⅓.

On the other hand, the pre-processing stage and post processing stage of the memory unit 400 may have different process proceeding rates. For example, in the case of displaying a still image, the first video data from the host may be the same regardless of the frame. Accordingly, the pre-processing stage of memory unit 400 may store the second video data related to the still image in memory unit 400, even if the second video data passes through the processing only once. In contrast, in the case of the display panel, the data voltages should be received for each frame, and the processing is repeatedly performed for each frame in the post processing stage of memory unit 400. However, in this embodiment, because the video data conversion unit 200 is positioned at the front of memory unit 400, the process proceeding rate may be reduced. Accordingly, the power consumption may also be reduced.

Figure 3:
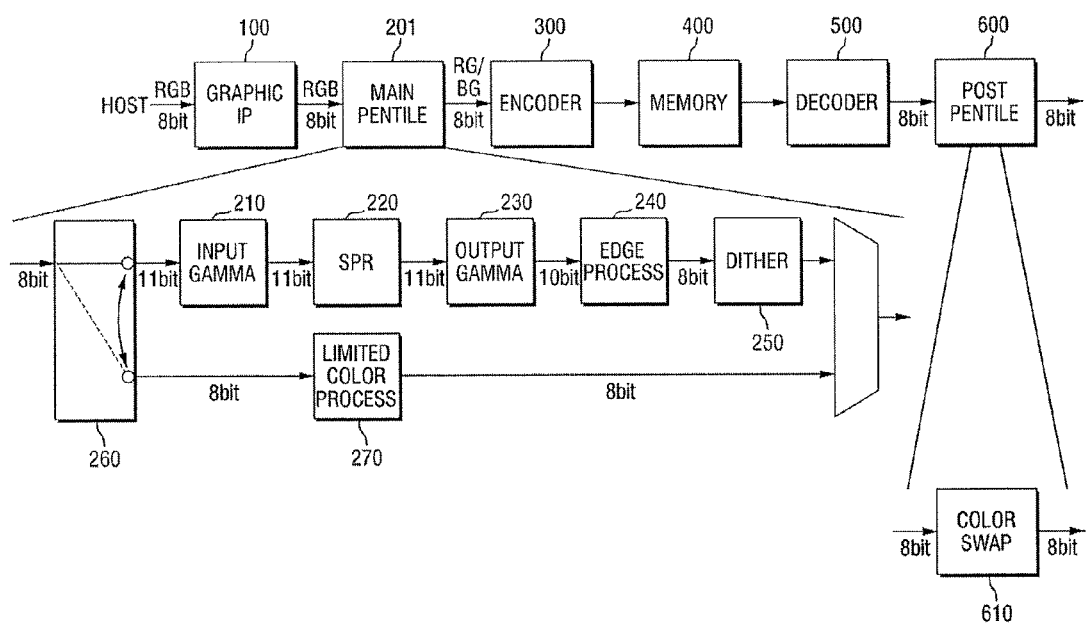
FIG. 3 illustrates another embodiment of a data driving unit.

FIG. 3 illustrates another embodiment of a data driving unit of a display driver, which, for example, may be used in FIG. 1. Referring to FIG. 3, a data driving unit of the display driver according to this embodiment is different from FIG. 2 in that a video data conversion unit 201 operates in plural modes. In order to operate in plural modes, the data driving unit of the display driver includes a mode selection unit 260 and a limited gradation data processing unit 270.

The display panel may display a full-color image or may display an image using a reduced or minimum number of colors. In this case, because it is not necessary to use whole gradations, it is efficient to simplify an image processing procedure.

A first mode is a high-gradation mode that corresponds to general data conversion. Thus, a full-color image is displayed in the first mode. A second mode is a low-gradation mode in which a reduced number of gradations are expressed. For example, the second mode may be a mode in which only eight colors are displayed. The eight colors may be implemented by on/off combination of R, G, and B colors.

The mode selection unit 260 selects the first mode or second mode depending on whether the input image is a full-color image or a limited gradation image. If the first mode is selected, the same process as the data conversion process according to the embodiment of FIG. 2 may be performed.

When the second mode is selected, the first video data is input to the limited gradation data processing unit 270. The limited gradation data processing unit 270 may include a gradation adjustment unit and a pixel mapping unit.

The first video data may be input to the gradation adjustment unit. The gradation adjustment unit may adjust the input first video data to a simplified gradation, for example, the maximum gradation or the minimum gradation. For example, if the most significant bit of the first video data of 8 bits is 1, the gradation adjustment unit changes all lower bits to 1 (i.e., 11111111). If the most significant bit of the first video data of 8 bits is 0, the gradation adjustment unit changes all lower bits to 0 (i.e., 00000000).

The first video data, which has it gradation adjusted by the gradation adjustment unit, is input to the pixel mapping unit. The pixel mapping unit changes the RGB data format of the first video data to match the RG/BG data format of the second video data. The pixel mapping unit may be a simplified pixel mapping unit. For example, in the case of mapping RGB data on R pixel and G pixel, the pixel mapping unit may perform the mapping of R data and G data on the corresponding pixels as they are, and may delete B data. Further, in the case of mapping RGB data on B pixel and G pixel, the pixel mapping unit may perform the mapping of B data and G data on the corresponding pixels as they are, and may delete R data.

The second video data generated from the pixel mapping unit is output as an output value of limited gradation data processing unit 270 and is input to data compression unit 300. The number of bits of the second video data output through the first mode may be equal to the number of bits of the second video data output through the second mode.

As described above, it is exemplified that the first video data is input to the gradation adjustment unit, which adjusts the gradation of the first image data. Then, the gradation-adjusted first video data is converted to the second video data through the pixel mapping unit. However, the first video data may be first input to the pixel mapping unit, which converts the first video data into the second video data. Then, the converted second video data may be input to the gradation adjustment unit, which adjusts the gradation of the second video data.

On the other hand, although the pixel mapping unit converts the first video data to the second video data in the second mode in a similar manner to sub-pixel rendering unit 220 in the first mode, the corresponding pixels are simply deleted without combining the video data of the neighboring pixels. Thus, the algorithm is greatly simplified.

Further, the second mode is a low-gradation mode, In the second mode, one or more processes, such as input gamma, output gamma, and dithering for expressing detailed gradations, may be omitted. Accordingly, if the second mode is selected, the process is simplified and power consumption is further reduced.

Figure 4:
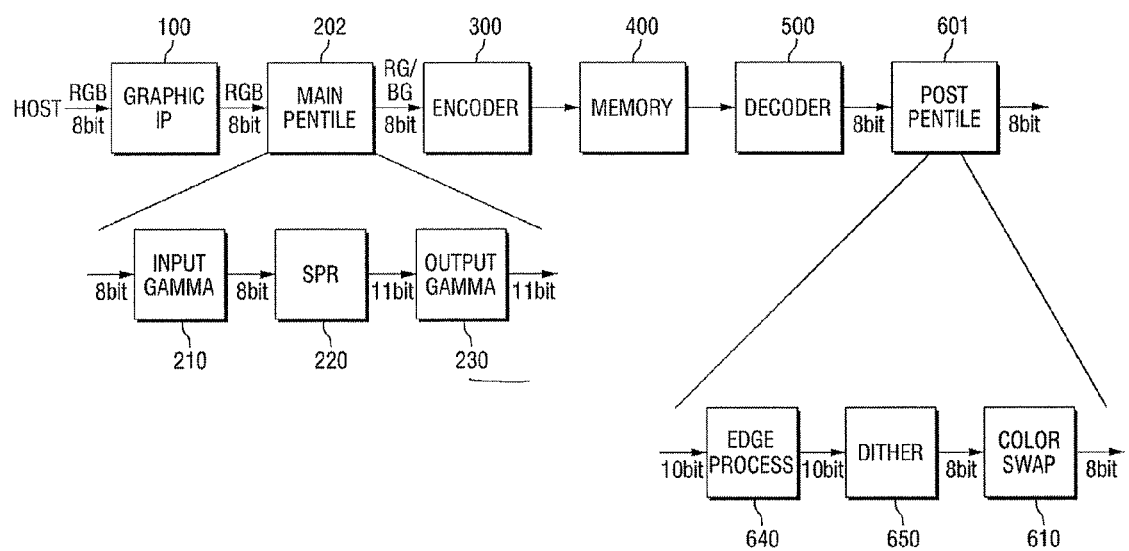
FIG. 4 illustrates another embodiment of a data driving unit.

FIG. 4 illustrates another embodiment of a data driving unit, which, for example, may be used in FIG. 1. Referring to FIG. 4, the data driving unit according to this embodiment is different from FIG. 3 in that a frame edge processing unit 640 and a dithering unit 650 are not arranged on the video data conversion unit at the front of memory unit 400, but are arranged on post data processing unit 601 at the rear of memory unit 400.

The video data conversion unit 200 outputs the second video data from output gamma unit 230 to data compression unit 300. Because the video data conversion unit 200 does not include dithering unit 250, the second video data output from video data conversion unit 200 keeps 10 bits. Accordingly, data compression unit 300 performs compression using the second video data of 10 bits, and the second video data that is restored through data restoration unit 500 also includes 10 bits.

If the second video data is provided to post data processing unit 600, frame edge processing unit 640 corrects the video data at the edge portions of the display panel to output the corrected video data. The dithering unit 650 performs dithering of the corrected video data. The dithering unit 650 may perform spatial dithering or temporal dithering. As the result of the dithering, the number of bits of the second video data may be reduced, for example, to 8 bits. The dithered second video data may be output to the display panel side through color swap unit 610.

In this embodiment, because dithering unit 650 is positioned on post data processing unit 600, it may perform not only spatial dithering but also temporal dithering. For example, dithering unit 650 may perform temporal dithering by selectively adding the next most significant bit value (third least significant bit based on the input data) of the neighboring pixel and deleting the two least significant bits. Thus, a video image similar to the original video image may be implemented. Further, dithering unit 650 may perform a combination of the spatial dithering and temporal dithering. Accordingly, a more accurate video image may be implemented, and thus picture quality may be improved.

Unlike this embodiment, frame edge processing unit 640 may be arranged on video data conversion unit 202, and only dithering unit 650 may be arranged on post data processing unit 610.

Figure 5:
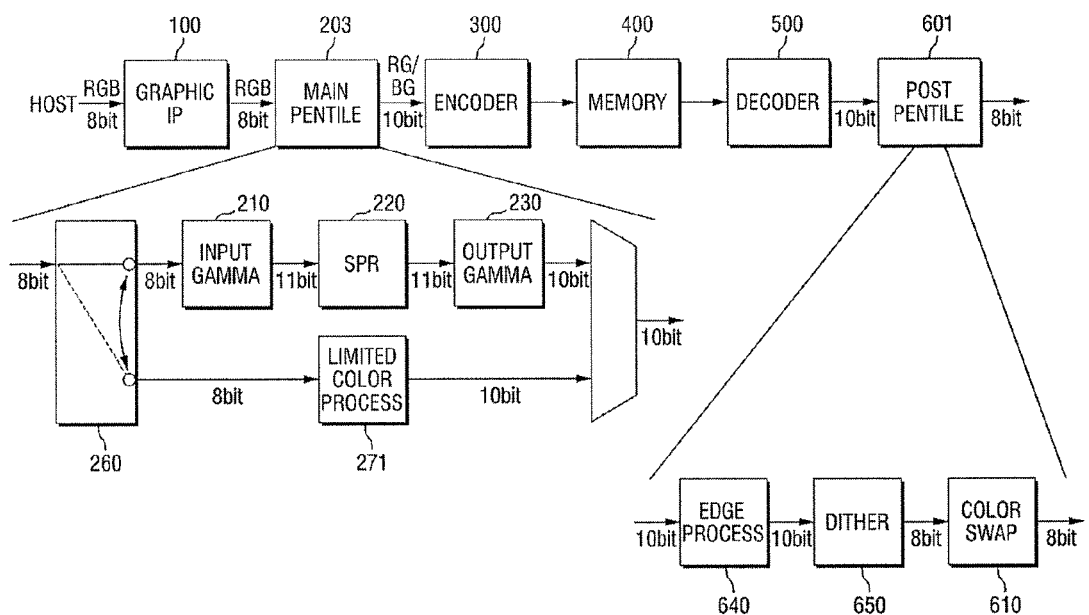
FIG. 5 illustrates another embodiment of a data driving unit.

FIG. 5 illustrates another embodiment of a data driving unit, which, for example, may be used in FIG. 1. Referring to FIG. 5, this embodiment is an example of a combination of embodiments of FIGS. 3 and 4. For example, the data driving unit may include mode selection unit 260. If the second mode is selected, the process may therefore be simplified.

However, unlike the embodiment of FIG. 3, dithering is not performed in video data conversion unit 203, and the second video data output in the first mode may be 10 bits. Thus, the input value of data compression unit 300 may be set to match 10 bits. Accordingly, output in the second mode may be set to have the same number of bits as data output in the first mode.

To accomplish this effect, a limited gradation data processing unit 271 may further include a dummy bit addition unit. The dummy bit addition unit may add dummy bits as the lower bits of the second video signal. For example, the dummy bit addition unit may add two dummy bits to the second video data of 8 bits to output 10 bits.

On the other hand, the same dummy bits may be added regardless of the gradation of the second video data. For example, the dummy bits may be fixed to 00. If the second video data is 11111111, 1111111100 may be output. If the second video data is 00000000, 0000000000 may be output.

In another embodiment, different dummy bits may be added according to the gradation of the second video data. For example, if the second video data is 11111111, the dummy bits of 11 may be added thereto to output 1111111111. If the second video data is 0000000000, the dummy bits of 00 may be added thereto to output 0000000000.

Figure 6:
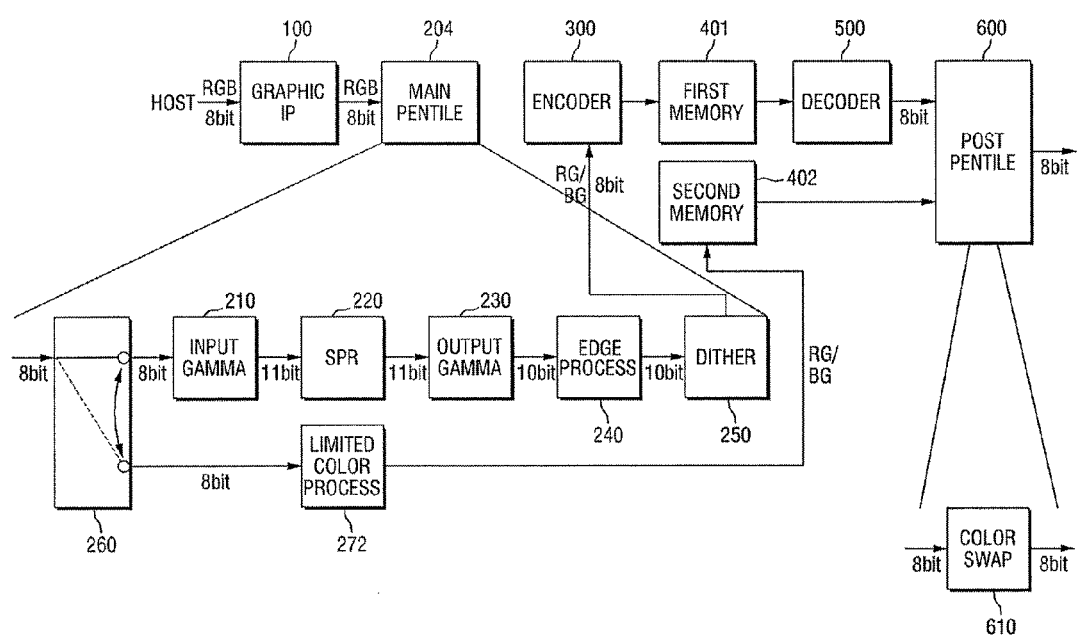
FIG. 6 illustrates another embodiment of a data driving unit.

FIG. 6 illustrates another embodiment of data driving unit, which, for example, may be used in FIG. 1. Referring to FIG. 6, the data driving unit according to this embodiment is different from FIG. 3 in that the memory unit includes a first memory unit 401 and a second memory unit 402.

When the first mode is selected, the first video data is converted to the second video data through video data conversion unit 204. Then, the converted second video data is input to data compression unit 300. The data compression unit 300 compresses the second video data, and stores the compressed second video data in first memory unit 401. The first memory unit 401 may be substantially the same as memory unit 400 in FIG. 2 or 3.

When the second mode is selected, the first video data is input to a limited gradation data processing unit 272 of image data conversion unit 204. The limited gradation data processing unit 272 includes a gradation adjustment unit and a pixel mapping unit.

The gradation adjustment unit adjusts the gradation and the number of bits at the same time. For example, the gradation adjustment unit adjusts the input first video data to the maximum gradation or the minimum gradation, and reduces the number of bits. For example, if the most significant bit of the first video data of 8 bits is 1, the gradation adjustment unit removes all the seven lower bits and outputs the most significant bit 1. If the most significant bit of the first video data of 8 bits is 0, the gradation adjustment unit removes all the seven lower bits and outputs most significant bit 0. The pixel mapping unit receives the first video data of one bit, and generates the second video data of one bit.

Accordingly, the limited gradation data processing unit 272 receives the first video data of 8 bits and outputs the video data of one bit. The output video data of one bit may not be input to data compression unit 300, but may be directly input to second memory unit 402. Although the second video data does not pass through the data compression unit 300, the number of bits of the second video data output from the limited gradation data processing unit is reduced to ⅛ in comparison to the number of bits of the second video data output in the first mode. Accordingly, the second memory unit 402 can adopt a frame memory having a relative small capacity.

The second video data stored in second memory unit 402 may be directly input to post data processing unit 600 without passing through data restoration unit 500. Accordingly, in the second mode, the process is further simplified at the rear of the second memory. Thus, the power consumption may be further reduced. For example, the second mode may be used as the maximum power saving mode.

By way of summation and review, in order to generate full-color images, a plurality of color (e.g., red, green, and blue) pixels may be used. The color pixels may be arranged in various configurations, e.g., a stripe type. In providing full-color images, high resolution of a display screen has become a major issue. In order to increase resolution, the size of the pixels may be reduced. However, this approach may increase processing costs.

One proposed alternative includes arranging pentile-type pixels in a display. However, even when pixels are a pentile-type arrangement, video data from a host may be RGB data. Input RGB data is stored in a frame memory. In this case, in order to reduce capacity of the frame memory, the RGB data may be compressed for storage.

In order to apply this compressed RGB data to the pixels, the compressed RGB data is output from the frame memory, restored, and converted to pentile data. This requires a repeat performance of a complicated algorithm for each frame. As a result, power consumption is significant. Further, because the amount of input data increases, the capacity of the frame memory also increases and this increases manufacturing costs.

In accordance with one or more embodiments, a display driver is provided which may reduce memory capacity, power consumption, and/or manufacturing costs.

The methods and processes described herein may be performed by code or instructions to be executed by a computer, processor, or controller. Because the algorithms that form the basis of the methods are described in detail, the code or instructions for implementing the operations of the method embodiments may transform the computer, processor, or controller into a special-purpose processor for performing the methods described herein.

Also, another embodiment may include a computer-readable medium, e.g., a nontransitory computer-readable medium, for storing the code or instructions described above. The computer-readable medium may be a volatile or nonvolatile memory or other storage device, which may be removably or fixedly coupled to the computer, processor, or controller which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A display driver, comprising:
   a video data converter to convert RGB data to first pentile data;
   a data compressor to generate second pentile data by compressing at least a portion of the first pentile data;
   a memory to store at least the second pentile data; and
   a data restorer to restore the second pentile data into the first pentile data.

2. The display driver as claimed in claim 1, wherein the video data converter includes a sub-pixel renderer to change the RGB data to the first pentile data.

3. The display driver as claimed in claim 2, wherein the video data converter includes a ditherer to dither the first pentile data output from the sub-pixel renderer.

4. The display driver as claimed in claim 3, wherein:
   the video data converter includes an input gamma processor and an output gamma processor,
   the input gamma processor is to receive the RGB data and output an input gamma value to the sub-pixel renderer, and
   the output gamma processor is to receive the first pentile data from the sub-pixel renderer and to output an output gamma value to the ditherer.

5. The display driver as claimed in claim 2, wherein:
   the video data converter includes a limited gradation data processor, and
   the RGB data is input to the sub-pixel renderer in a first mode,
   the RGB data is input to the limited gradation data processor in a second mode, and
   the limited gradation data processor is to perform simplified gradation adjustment of the RGB data and conversion of the gradation-adjusted RGB data to the first pentile data.

6. The display driver as claimed in claim 5, further comprising:
   a ditherer to dither the first pentile data restored through the data restorer.

7. The display driver as claimed in claim 6, wherein the limited gradation data processor includes a dummy bit adder to adjust a number of bits of output data to be equal to a number of bits of output data of the sub-pixel renderer.

8. The display driver as claimed in claim 6, wherein the ditherer is to perform at least one of temporal dithering or spatial dithering.

9. The display driver as claimed in claim 5, wherein:
   the memory includes a first memory and a second memory,
   the first memory is to store the second pentile data compressed through the data compressor, and
   the second memory is to store the first pentile data converted through the limited gradation data processor.

10. The display driver as claimed in claim 1, further comprising:

a video graphics processor to receive the RGB data from a host, to convert video graphics, and to provide the converted video graphics to the video data converter.

11. The display driver as claimed in claim 1, further comprising:
a post data processor to process the first pentile data restored through the data restorer.

12. A display device, comprising:
a display panel including a plurality of pixels in a pentile-type arrangement; and
a display driver to drive the display panel, wherein the display driver includes:
a video data converter to convert RGB data to first pentile data;
a data compressor to generate second pentile data by compressing at least a portion of the first pentile data;
a memory to store at least the second pentile data; and
a data restorer to restore the second pentile data into the first pentile data.

13. The display device as claimed in claim 12, wherein the video data converter includes a sub-pixel renderer to change the RGB data to the first pentile data.

14. The display device as claimed in claim 13, wherein the video data converter includes a ditherer to dither the first pentile data from the sub-pixel renderer.

15. The display device as claimed in claim 14, wherein:
the video data converter includes input gamma processor and an output gamma processor,
the input gamma processor receives the RGB data and outputs an input gamma value to the sub-pixel renderer, and
the output gamma processor receives the first pentile data output from the sub-pixel renderer and outputs an output gamma value to the ditherer.

16. The display device as claimed in claim 13, wherein:
the video data converter includes a limited gradation data processor,
the RGB data is input to the sub-pixel renderer in a first mode,
the RGB data is input to the limited gradation data processor in a second mode, and
the limited gradation data processor performs simplified gradation adjustment of the RGB data and conversion of the gradation-adjusted RGB data into the first pentile data.

17. The display device as claimed in claim 16, further comprising:
a ditherer to dither the first pentile data restored through the data restorer.

18. The display device as claimed in claim 17, wherein the limited gradation data processor includes dummy bit adder to adjust a number of bits of output data to be equal to a number of bits of output data of the sub-pixel renderer.

19. The display device as claimed in claim 17, wherein the ditherer performs at least one of temporal dithering or spatial dithering.

20. The display device as claimed in claim 16, wherein:
the memory includes a first memory and a second memory,
the first memory is to store the second pentile data compressed through the data compressor, and
the second memory is to store the pentile data converted through the limited gradation data processor.

* * * * *